United States Patent [19]

Lipets et al.

[11] 4,305,455
[45] Dec. 15, 1981

[54] MULTIPASS CORROSION PROOF AIR HEATER

[76] Inventors: Adolf U. Lipets, prospekt Lenina, 150a, kv. 38; Svetlana M. Kuznetsova, Revoljutsionny prospekt, 16, kv. 21; Jury I. Lafa, ulitsa Mashinostroitelei, 28b, kv. 58, all of Podolsk Moskovskoi oblasti, U.S.S.R.

[21] Appl. No.: 16,069

[22] Filed: Feb. 28, 1979

[51] Int. Cl.³ .......................... F28F 19/00; F28F 9/22
[52] U.S. Cl. ................................ 165/134 R; 165/145; 165/DIG. 2
[58] Field of Search ...................... 126/67, 99 R, 99 A, 126/110 R; 165/134, 1, 117, 174, 176, 147

[56] References Cited

U.S. PATENT DOCUMENTS

| | | | |
|---|---|---|---|
| 1,914,604 | 6/1933 | Keenan et al. | 165/134 DP |
| 1,941,365 | 12/1933 | Patterson et al. | 165/134 DP |
| 2,511,647 | 6/1950 | Marshall | 165/134 DP |
| 2,820,614 | 1/1958 | Hardgrove | 165/134 DP |
| 2,951,685 | 9/1960 | Bliss et al. | 165/134 DP |
| 2,970,811 | 2/1961 | Ruch et al. | 165/134 DP |
| 2,994,724 | 8/1961 | Hillard, Jr. et al. | 165/147 |
| 3,194,214 | 7/1965 | Frendberg | 165/134 DP |
| 4,243,096 | 1/1981 | Lipets et al. | 165/134 DP |

*Primary Examiner*—Albert W. Davis
*Assistant Examiner*—Wesley S. Ratliff, Jr.
*Attorney, Agent, or Firm*—Lackenbach, Lilling & Siegel

[57] ABSTRACT

In an air heater, an initial group of passes on the airside is arranged in the form of a package wherein the passes consisting of banks of tubes are connected in parallel with the uptake gases.

The passes of the package are located predominantly at the same horizontal level, are made of tubes of the same length and run in a zone of the same gas temperatures which is dangerous insofar as corrosion can be provoked therein.

The width of the packaged passes progressively increases directly with the increase in the rates of air flow through the passes, and a feeding air duct admitting the last inflow of cold air is connected downstream of the last and widest pass to the connecting air duct serving the rest of the passes of the air heater.

In an apparatus like this one, assembled from standard components, minimum overall dimensions and low weight are combined with high thermal efficiency.

5 Claims, 10 Drawing Figures

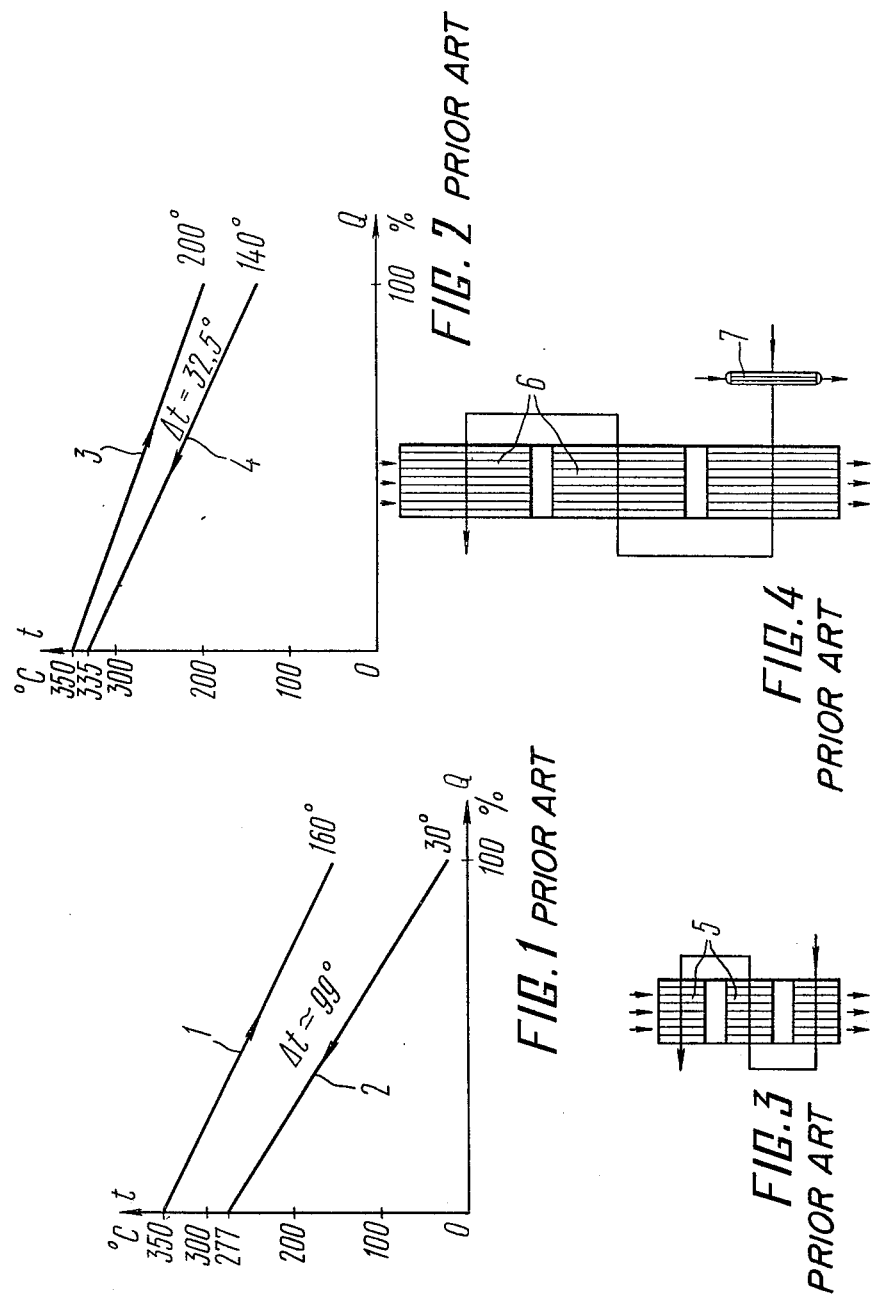

MULTIPASS CORROSION PROOF AIR HEATER

The present invention relates to heat-exchange equipment as well as to boiler construction and has a special reference to tubular air heaters used in conjunction with steam boilers, furnaces and other like apparatus wherein the aggressive, corrosion-provoking and hot uptake gases are used to heat cold air. In these air heaters, commonly of the multipass type on the airside, initial passes admitted whereinto cold air is admitted subject to intensive corrosion.

There are known air heaters wherein corrosion is subdued due to the preheating of air in special contrivances, e.g., radiators circulating steam or water rather than gas. Yet, with the dew point of the flue gases being high, such means of preheating the air are rather bulky and, furthermore, the economy of the entire air-heating system is low owing to the fact that the preheated air is incapable of absorbing as much of the heat from the gases as this is required in order to obtain deep cooling of the gases and, consequently, much of the residual heat is lost to the atmosphere. But even consenting to the cooling of the gases not as deep, the air heater must have a great heating surface in this case which is a factor calling for high metal requirements and rendering the heater a bulky apparatus.

SUMMARY OF THE INVENTION

It is an object of the present invention to provide such a multipass corrosionproof air heater which can be fabricated entirely from identical standard components.

It is an other object of the present invention to provide a multipass corrosionproof air heater with compact overall dimensions.

It is still another object of the present invention to provide a multipass corrosionproof air heater capable of functioning in conjunction with a means of preheating the air which requires minimum power for its operation and is of minimum size.

It is a further object of the present invention to provide a multipass corrosionproof air heater which renders a moderate resistance to the air flow and dispenses with intricate expansion joints between the adjacent banks of tubes.

These and other objects of the invention are attained by a multipass corrosionproof air heater incorporating banks of tubes which form heating surfaces arranged in separate passes connected in series by way of connecting air ducts to form the airside. The multipass air heater also incorporating feeding air ducts wherethrough cold air is admitted, and one of which contains a means of preheating an initial comparatively small fraction of the cold air fed into the first pass while the rest of the feeding air ducts are connected to the respective connecting air ducts. The air heater is characterized by an initial group of passes, said first pass including, and being provided in the form of a package with banks of heating tubes connected in parallel with the uptake gases so that they are located in a zone of the same gas temperatures wherein the relationship between the temperature of air and that of the gases is apt to provoke corrosion and a feeding air duct admitting the rest of the cold air is connected downstream of the last pass in said package to a connecting air duct communicating with the rest of the passes of the air heater.

An engineering solution like this one achieves high operational effectiveness of the air heater along with corrosion resistance combined with minimum size and weight. Also the means of preheating air can be fabricated at minimum cost in this case.

According to an embodiment of the present invention, the multipass corrosionproof air heater is characterized in that all the tubes in the banks of said package of passes are of the same length and the package is arranged at the same horizontal level.

By virtue of this plan, the air heater can be fabricated from standard components at minimum cost and the package of passes can be mounted on a conventional frame.

In accordance with another embodiment of the present invention, the multipass corrosionproof air heater is characterized in that the width of the packaged passes progressively increases directly with the increase in the rates of air flow through the passes.

The solution of the engineering problem on such lines is conducive to obtaining the same air velocities in the packaged passes along with uniform temperatures which is a factor allowing one to dispense with intricate expansion joints and to keep the resistance to air flow within acceptable limits.

BRIEF DESCRIPTION OF THE DRAWING

The present invention will now be described in detail by way of an example with reference to the accompanying drawings in which:

FIG. 1 is a graph illustrating the way the temperatures of the gases and air are changing depending on heat transfer along the surface of a conventional air heater lacking the noncorroding feature;

FIG. 2 is a graph illustrating the way the temperatures of the gases and air are changing depending on heat transfer along the surface of a conventional corrosionproof air heater;

FIG. 3 is an outline schematic drawing of a conventional three-pass air heater lacking the noncorroding feature;

FIG. 4 is an outline schematic drawing of a conventional threepass corrosionproof air heater;

DESCRIPTION OF THE PREFERRED EMBODIMENT

Figure 6:
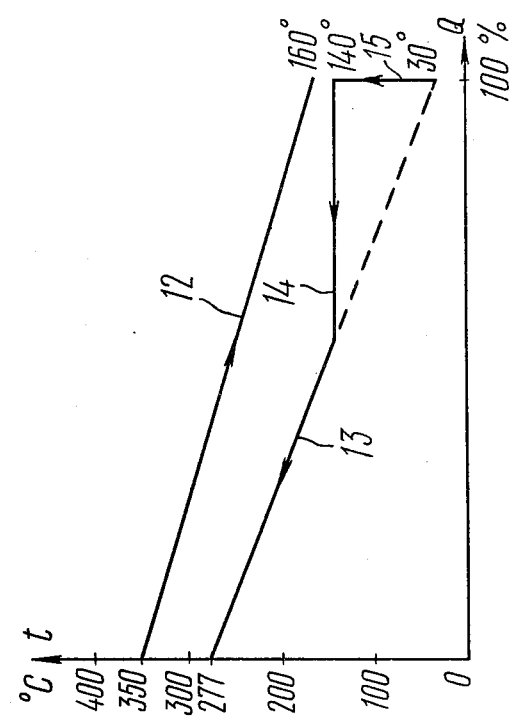
FIG. 6 is a graph illustrating the way the temperatures of the gases and air are changing depending on heat transfer along the surface of an ideal cascade air heater.

It will be noted that FIG. 1 provides a numerical example of the relationship existing between a gas temperature 1 and an air temperature 2 due to heat transfer along the surface of a conventional air heater deprived of the noncorrosive feature; whereas FIG. 2 gives the same relationship for a conventional corrosionproof air heater, wherein the gases 3 are cooled to a temperature which is higher than in the preceeding example while the air 4 consequently warms up to a lesser extent which is 195° C. instead of 247° C.

It will be also noted that the temperature gradient in the corroding air heater functioning without preheating in the example of FIG. 1 is $\Delta t \simeq 99°$ C. whereas in the corrosionproof air heater of FIG. 2 the temperature gradient is $\Delta t \simeq 32.5°$ C.

Consequently, the heating surface in the latter air heater is substantially greater than that in the former one. This is vividly exemplified by comparing FIGS. 3 and 4 which illustrate a corroding and a corrosionproof air heater, respectively. The heating surface 5 of the air heater illustrated in FIG. 3 is smaller than the heating surfaces 6 in the air heater with a radiator 7 of FIG. 4 by roughly 60 percent despite the fact that the gases leaving the former air heater are colder than those outflowing from the latter one, the respective temperatures being 160° and 200° C. Thus, it is evident that corrosion resistance is achievable in the conventional air heater at a high cost. Since absolute corrosion resistance is practically not feasible to achieve, recourse is to a comparatively small preheating of air along with tolerating regular replacements of the cold end in the air heater. This all prevents as a rule the use of tubular air heaters when sulphureous fuel is being combusted.

The invention disclosed is based on directing the flow of air through the heater in a rather peculiar way referred to as the cascade method of air heating. Its essence is as follows.

Subject to a high-temperature preheating which is unavoidable for the protection of the air heater against corrosion, just a small (as small as this is desirable) fraction of air is introduced into the heater at the inlet, and the rest of the cold air is gradually added to this initial fraction either batchwise or continuously as the air flow progresses along the heater. Said additional inflows of air are conducted so that practically no increases in the air temperature are observed while the air makes its way into the region of high-temperature gases or the air temperature even drops to some extent. The additional inflows of air are continued to a place where the relationship between the temperature of gases and that of the air ceases to be dangerous as a corrosion-provoking one, i.e., at a point where the temperature of the metal alone is higher than the dew point. In an extreme case, almost no heat is required to cope with the preheating of air and the means of preheating can be as small as this is desirable.

Figure 5:
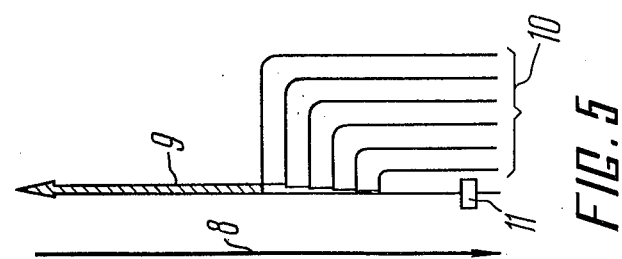
FIG. 5 is a sketch illustrating the pattern of gas and air flow employed with the cascade method of air heating.

The pattern of air flow referred to above and effected through the cascade method of air heating is illustrated in FIG. 5. Shown at 8 is the gas flow, the air flow is shown at 9, the in flows of cold air are denoted by 10 and a radiator is shown at 11.

Furthermore, FIG. 6 depicts the relationship between the temperature 12 of gases and the temperature 13 of air due to the heat transfer through the surface of an ideal cascade air heater, the temperatures of the case under consideration being indicated for a clear understanding. Particular attention is called to the way in which the air temperature 14 is affected in the zone of inflows of cold air, being there constant in spite of the fact that air does absorb heat from the gases. Air in any small amount as this is desired is preheated to the temperature 14 at the inlet into the air heater along the line shown at 15. Comparing FIG. 6 with FIG. 1, we can come to a conclusion that the temperature gradient $\Delta t$ featured by the cascade air heater differs but little from the temperature gradient obtained in the conventional corroding air heater under the conditions of identical economy (i.e., at the same exit gas temperature of 160° C.), being however lower at the cold end. This implies that the surface of an air heater employing the cascade pattern of air flow is only slightly greater than that of the conventional corroding air heater. What is, however, important is that the entire surface of the cascade air heater is removed from the zone of temperatures which are likely to provoke corrosion.

Figure 7:
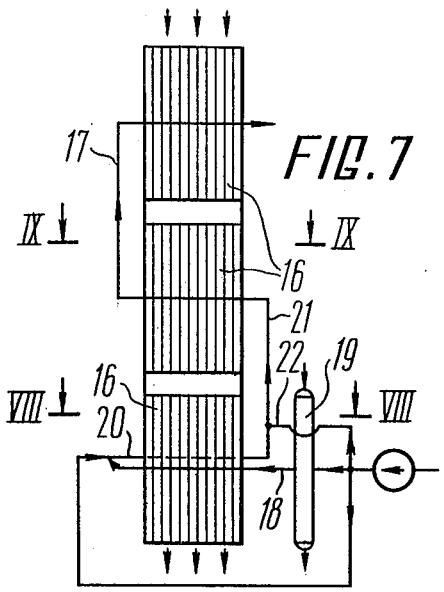
FIG. 7 is a schematic view in elevation of a multipass corrosionproof air heater made in accordance with the present invention.
Figure 8:
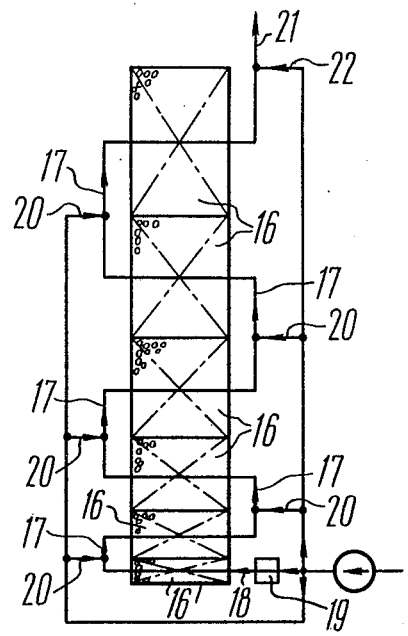
FIG. 8 is a sectional view along the line VIII—VIII of FIG. 7 illustrating a package of initial passes at the cold end of the air heater.

The multipass corrosionproof air heater disclosed employs the cascade pattern of air heating with stagewise inflows of cold air. It is illustrated by way of an example in the schematic drawing of FIG. 7 which is an elevation of the heater as well as in plan views of FIGS. 8 and which depict the cold and hot ends, respectively.

The appearance of the air heater is a quite common one. It comprises identical banks of tubes attached to tube plates, the hot gases passing through the tubes while the cold air is flowing outside the tubes. The banks of tubes forming the heating surfaces are fitted in the example under consideration in three tiers one above another, and the banks are arranged in separate passes 16 (there is a total of eight passes) interconnected in series by way of connecting air ducts 17. Cold air is fed into the air heater over a number of feeding air ducts one of which is shown at 18, and contains a means 19 for preheating a small fraction of air and communicates with a first pass 16' of the air heater. The rest of the feeding air ducts 20 are connected to the respective connecting air ducts 17. The six initial passes 16 are arranged in a package and are located at the same (i.e., first) tier of the air heater. In other words, they are located in a zone of the same gas temperatures and are exposed to the same flow of gases. Said zone is one in which the relationship between the temperature of gases and that of air is likely to induce corrosion. The passes 16 of the second and third tiers are located above said zone and are consequently safe. The air flowing through these passes is already sufficiently hot and so are the gases circulating through the tubes with the result that the temperature of the metal is above the dew point.

A connecting air duct 21 connects the last (i.e., sixth) pass 16 of the package to the second tier of banks of tubes constituting the seventh pass of the air heater. A feeding air duct 22 introducing the last inflow of cold air is connected to the connecting air duct 21 and further downstream it is the entire mass of air which flows through the second and third tiers (i.e. seventh and eighth passes) of the air heater. The fact that the six initial passes are arranged into the package located at the same tier of the air heater illustrates the possibility of introducing cold air in the requisite number of inflows through the intermediary of a compact arrangement without changing the traditional shape of the air heater. Since the packaged passes are formed by tubes of the same length, the construction of the air heater is extremely simple and the entire heater can be made of the same components. Consequently, the fabrication of the air heater poses no problems while the fitting of the air heater to the frame is also a simple job, as the package is located at the same horizontal level.

A salient feature of the air heater disclosed is the width of the packaged passes. It is selected so as to be in agreement with the rate of air flow through each of the passes and increases from pass to pass as this can be noted from FIG. 8. As a result, the velocities of air flow through the passes containing tubes of the same length are also the same and so are the rates at which the air temperature increases. The consequence is that the passes of the package are free from relative displacements due to temperature differences. They all expand exactly by the same amount which is a factor simplifying construction, for the package comprising six passes behaves like a single pass. Under the conditions when the air velocities are all the same, the total resistance of the passes to the flow of air is at its minimum.

The air heater disclosed operates as follows.

Cold air is admitted into the air heater over several feeding air ducts. One such air duct 18, which is smaller than the rest of the air ducts, contains a means 19 for preheating the air which is admitted thereinto in a small amount and is thence fed into the first pass 16' over said duct being heated to a temperature sufficiently high to prevent the corrosion of the first pass. The air heated in the first pass 16 is introduced into the second pass 16 over a connecting air duct 17 into which another feeding air duct 20 admits a portion of cold air. Intermixing with the hot air, the cold air reduces its temperature which becomes consequently the same as at the outlet from the means for preheating 19. The air, now in an increased amount, is heated in the second pass 16 to the same point as in the first one due to an increase in the width of the second pass compared with that of the first one to accommodate the higher rate of air flow. The connecting air duct 17 leading to the third pass 16 receives another inflow of cold air through the next feeding air duct 20 of an increased size, and the air mixture heats in the third pass to the same temperature as in the first and second passes. This pattern is followed up to the sixth pass of the package comprising the initial passes. Downstream of the sixth pass, which is the widest one, the rest of the cold air is introduced by way of the feeding air duct 22 into the connecting air duct 21 which serves to connect the package to the next pass 16 at the hot end of the heater. After that the entire air, being sufficiently hot, passes through the two last passes of the air heater which are the seventh and eighth passes.

Figure 9:
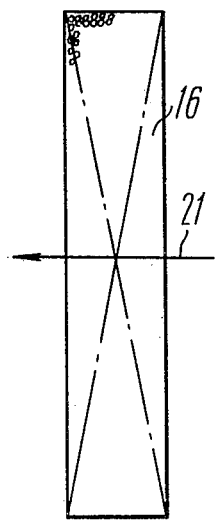
FIG. 9 is a sectional view along the line IX—IX of FIG. 7 illustrating the hot end of the air heater.

It is thus evident that admitted everywhere into the package comprising the six initial passes, connected in parallel with the gases and arranged in the zone of the same gas temperatures, is air at the same high temperature and this air is heated up inside the package to the same point. In other words, the entire package functions as a singlepass air heater. Said conditions keep the temperature of the metal of the tubes at the cold end of the air heater at a point which assures corrosionproof operation of the heater. The rest of passes of the heater though exposed to high air and gas temperatures, are arranged outside the corrosive zone. As it can be seen from FIG. 9, the layout of of the hot end does not differ from that of the cold end illustrated in FIG. 8 save a number of partitions available at the cold end of the air heater.

The hot air leaving the air heater is fed into the boiler furnace, kiln or elsewhere.

Figure 10:
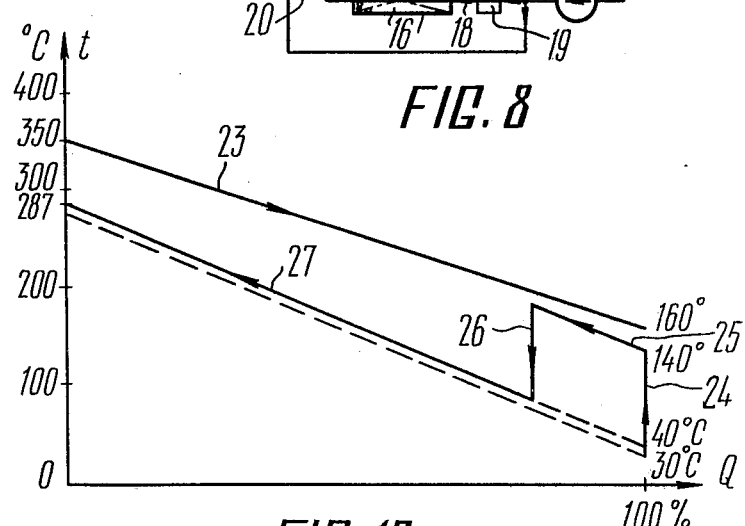
FIG. 10 is a graph illustrating the way the temperatures of the gases and air are changing depending on heat transfer along the surface of a multipass corrosionproof air heater made in accordance with the present invention.

Exemplified in FIG. 10 is the relationship between the gas temperature 23 and the air temperature inside the air heater disclosed.

Since only a small fraction of air is subject to preheating (line 24), the resulting temperature of the air flow (40° C.) does not differ substantially from the temperature of the cold air, iimlying that the air fed through the heater disclosed can absorb much of the heat from the flue gases and cool them deeply down (apparently not as low as the preheated air temperature).

While flowing through the passes at the cold end, air warms up along the line 25 as in a single pass and then cools down along the line 26 by being mixed in the connecting air duct 21 (FIGS. 7 and 8), leading to the hot end, with the last inflow of cold air. On entering the hot end, the entire air heats further up along the line 27. The temperature gradient operating in the air heater is sufficiently high to provide for a heating surface of moderate extent which is by far smaller than in the conventional corrosionproof air heater.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A multipass, corrosionproof air heater comprising:
   a group of tier passes forming a package with each group of tier passes having banks of tubes forming heating surfaces, and said tubes being arranged in a plurality of tier passes successively connected in series by way of connecting air ducts to form the airside arrangement of said air heater; a plurality of further air ducts for feeding cold air to the first bank of tubes; said first bank of tubes having a plurality of passes; one of said further air ducts including means for preheating an initial comparatively small fraction of the cold air which is to be fed into the initial pass of said plurality of passes in said first bank of tubes while the remaining air ducts of said plurality of further air ducts are connected to respective connecting air ducts for forming with uptake gases a parallel connection of said plurality of passes within said first bank of tubes; said first bank of tubes being located in a zone of the same gas temperatures and being exposed to the same flow of gases wherein the relationship between the temperature of air and that of gases is apt to provoke corrosion; and one of said further air ducts feeding the balance of the cold air connected downstream of the last pass of said plurality of passes in said first bank of tubes to the connecting air duct communicating with the next tier pass of said air heater.

2. A multipass corrosionproof air heater as claimed in claim 4, wherein all the tubes in the banks in said package are of the same length and the package is arranged at the same horizontal level.

3. A mulitpass corrosionproof air heater as claimed in claim 1, wherein the width of said tier passes progressively increases directly with the tier increase in the rates of air flow through the passes.

4. A multipass corrosionproof air heater as claimed in claim 1 wherein the bank of tubes in said first tier pass comprises six passes.

5. A multipass corrosionproof air heater as claimed in claim 1, wherein there is a total of 8 passes in said air heater and said bank of tubes in said first tier pass comprises 6 passes.

* * * * *